UNITED STATES PATENT OFFICE.

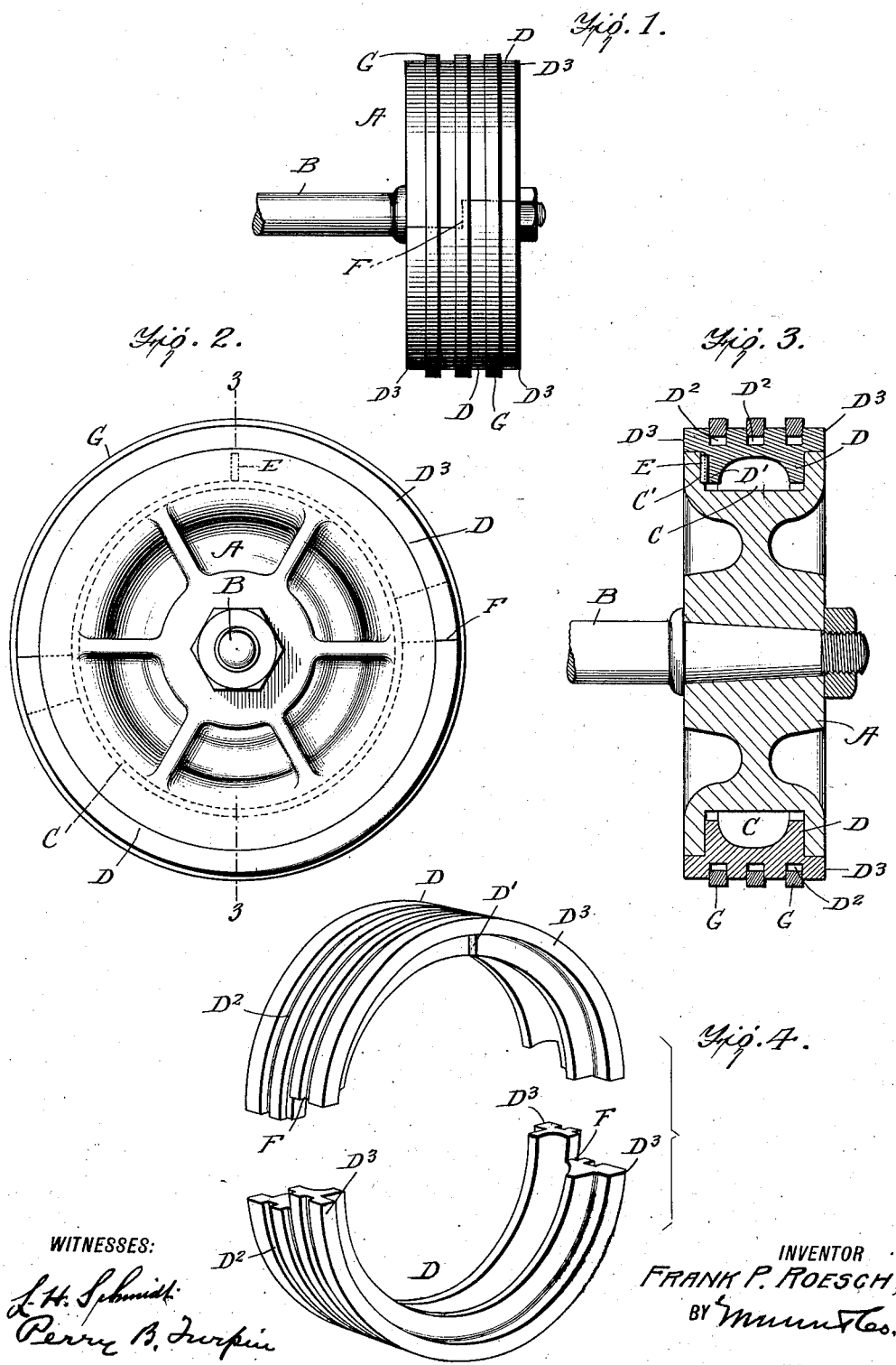
F. P. ROESCH.
PISTON HEAD.
APPLICATION FILED NOV. 29, 1910.
985,065.
Patented Feb. 21, 1911.
INVENTOR
FRANK P. ROESCH,

FRANK PIENIE ROESCH, OF DOUGLAS, ARIZONA TERRITORY.

PISTON-HEAD.

985,065.

Specification of Letters Patent.   Patented Feb. 21, 1911.

Application filed November 29, 1910. Serial No. 594,640.

*To all whom it may concern:*

Be it known that I, FRANK P. ROESCH, a citizen of the United States, and a resident of Douglas, in the county of Cochise and Territory of Arizona, have invented certain new and useful Improvements in Piston-Heads, of which the following is a specification.

This invention is an improvement in piston heads and has for an object to provide a novel construction of what is known as the bull-ring by forming the said bull-ring in two segmental sections fitted together around the body of the piston and receiving the snap rings by which the packing of the piston within the cylinder is secured; and the invention consists in certain novel constructions and combinations of parts as will be hereinafter described and claimed.

In the drawing Figure 1 is a side view of a piston embodying my invention. Fig. 2 is an end view thereof. Fig. 3 is a cross section on about line 3—3 of Fig. 2. Fig. 4 is a detail perspective view illustrating the two segmental sections of the so-called bull-ring.

In the construction shown, the piston head has a body A which may be of steel suitably secured to the piston rod B and the said body A is provided with a circumferential groove C in which is fitted the segmental bull-ring sections D, as shown. These bull-ring sections may be of cast iron and may be easily renewed when worn, the body C and ring sections D being assembled in a simple manner and secured when in use, without the necessity of bolts or the like, so that a practically boltless piston head is provided.

One of the walls of the groove C is notched at C' and the bull-ring section D is correspondingly notched at D', the notches C' and D' receiving a dowel pin E by which the bull-ring will be held from turning upon the body A.

The sections D are formed at their meeting ends to provide a lap joint at F and these sections D are provided in their outer sides with circumferentially extending grooves D² which receive the packing rings G. These packing rings G may be of ordinary construction. The bull-ring sections D are provided at their opposite edges with flanges or extensions D³ which overlap the side walls of the groove C, as best shown in Fig. 3 of the drawing.

It will be noticed from the foregoing and the accompanying drawing, that the important feature of my invention is the novel form of the so-called bull-ring, that is to say, made in segmental sections so that the sections may be applied to and removed from the body of the piston, the latter having a groove with integral side walls or flanges adapted to receive the sections of the bull-ring, the bull-ring distinguishing from the ordinary bull-ring in being made in segmental sections and not a solid unbroken ring, as usual. By the described construction I avoid the necessity of bolts, follower plates, etc. and render it convenient to renew the bull-ring when it becomes worn and retain the piston head proper without the necessity of removing the piston head from the piston rod.

I claim:

1. The improvement in pistons herein described, comprising the piston body having a circumferential rim groove with the walls thereof integral with each other and provided in the inner face of one of the walls of the said groove with a notch, a bull-ring made in separate segmental sections with lap joints at their ends and fitting in said groove, one of said sections being provided with a notch coinciding with that in the piston body, the bull-ring sections having edge flanges overlapping the walls of the groove in the piston body and the said sections being provided in their outer sides with circumferentially extending grooves, packing rings in the said grooves and a pin in the coinciding notches of the piston body and bull-ring sections, substantially as set forth.

2. A piston head comprising a one piece solid or integral body portion having a circumferential rim groove, segmental bull-ring sections fitting in said groove and packing carried by said sections, substantially as set forth.

3. A piston comprising a one piece solid or integral body portion having a circumferential rim groove and a bull-ring fitting in said groove and composed of separate segmental sections, substantially as set forth.

4. A boltless piston head having a one piece solid or integral body portion, packing, and a bull-ring carrying the packing and made in separate segmental sections, substantially as set forth.

5. A piston head comprising a one piece solid or integral body portion having a circumferential rim groove, a bull-ring fitting in said groove and composed of separate segmental sections having lap joints at their meeting ends and circumferentially extending grooves in their outer faces and packing rings in said grooves of the sections, substantially as set forth.

6. The improved piston head herein described, comprising a body having a circumferential rim groove, a bull ring made in separate segmental sections with lap joints at their ends and fitting in the groove of the body, said segmental sections being provided with circumferential grooves for packing grooves and packing rings in the grooves of said sections and overlapping the joints between the ends of said sections, substantially as set forth.

FRANK PIENIE ROESCH.

Witnesses:-
W. W. LYEN,
E. L. CARLETON.